(12) United States Patent  
Yoon et al.

(10) Patent No.: US 7,715,347 B2  
(45) Date of Patent: May 11, 2010

(54) METHOD OF ENABLING A COMBINED DATA RATE CONTROL LOCK CHANNEL IN A WIRELESS COMMUNICATION SYSTEM

(75) Inventors: Young C. Yoon, San Diego, CA (US); Li-Hsiang Sun, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 584 days.

(21) Appl. No.: 11/534,105

(22) Filed: Sep. 21, 2006

(65) Prior Publication Data

US 2007/0070952 A1    Mar. 29, 2007

Related U.S. Application Data

(60) Provisional application No. 60/719,406, filed on Sep. 21, 2005.

(51) Int. Cl.
| | |
|---|---|
| H04W 4/00 | (2009.01) |
| H04B 1/00 | (2006.01) |
| H04B 7/00 | (2006.01) |
| G06F 11/30 | (2006.01) |
| G08C 25/00 | (2006.01) |
| H03M 13/00 | (2006.01) |
| H04L 1/14 | (2006.01) |

(52) U.S. Cl. .................. 370/332; 370/328; 370/334; 370/338; 455/69; 714/746; 714/750

(58) Field of Classification Search ............... 370/334, 370/328, 332, 338; 455/69; 714/746, 750
See application file for complete search history.

(56) References Cited

U.S. PATENT DOCUMENTS

| | | | | |
|---|---|---|---|---|
| 6,768,727 | B1 * | 7/2004 | Sourour et al. | 370/335 |
| 7,356,005 | B2 * | 4/2008 | Derryberry et al. | 370/335 |
| 2004/0166887 | A1 * | 8/2004 | Laroia et al. | 455/522 |
| 2004/0202146 | A1 * | 10/2004 | Lee | 370/350 |
| 2006/0072567 | A1 * | 4/2006 | Casaccia et al. | 370/389 |
| 2006/0268883 | A1 * | 11/2006 | Qian et al. | 370/394 |
| 2007/0049317 | A1 * | 3/2007 | Qi et al. | 455/522 |

* cited by examiner

*Primary Examiner*—Dwayne Bost  
*Assistant Examiner*—Larry Sternbane  
(74) *Attorney, Agent, or Firm*—Lee, Hong, Degerman, Kang & Waimey

(57) ABSTRACT

A method of assigning feedback information in a portion of a Medium Access Control (MAC) channel in a wireless communication system is disclosed. More specifically, the method includes receiving at least two pilot signal from an access network (AN) on at least two forward traffic channel, transmitting at least two channel quality information on a single reverse carrier to the AN reporting at least one of strength and quality of each corresponding forward pilot channel, wherein the channel quality information indicates a desired data rate for receiving data on the corresponding forward traffic channel, and receiving feedback information through a forward control channel of the AN, wherein the feedback information includes combined channel quality information which indicates whether or not the AN is able to receive multiple channel quality information sent by an access terminal (AT) on the single reverse carrier.

8 Claims, 4 Drawing Sheets

METHOD OF ENABLING A COMBINED DATA RATE CONTROL LOCK CHANNEL IN A WIRELESS COMMUNICATION SYSTEM

This application claims the benefit of U.S. Provisional Application No. 60/719,406, filed on Sep. 21, 2005, which is hereby incorporated by reference.

BACKGROUND OF THE INVENTION

1. Field of the Invention

The present invention relates to a method of transmitting information of combined information which applies uniformly to all recipients, and more particularly, to a method of enabling a combined data rate control lock channel in a wireless communication system.

2. Discussion of the Related Art

In a multiple access communication system, communications between users are conducted through one or more base stations, also referred to as an access network (AN). Here, multiple access refers to simultaneous transmission and/or reception. Several multiple access techniques are known in the art, such as time division multiple access (TDMA), frequency division multiple access (FDMA), amplitude modulation multiple access and code division multiple access (CDMA).

In general, multiple access communication system can be wireless or wired and can carry voice and/or data. An example of a communication system carrying both voice and data is a system in accordance with the IS-95 standard and a system conforming to the $3^{rd}$ Generation Partnership Project 2 (3GPP2).

In the multiple access communication system, communication between users can be implemented through one or more base stations or ANs. A first user on one mobile station, which is also referred to as an access terminal (AT) or a subscriber station, communicates to a second user on a second mobile station or AT by transmitting data on reverse link (RL) to an AN. The AN (base station) can receives the data and can route the data to another AN. The data is then transmitted on a forward link (FL) of the same AN or different AN to the second AT (mobile station). Here, the FL refers to transmission from an AN to an AT, and the RL refers to transmission from an AT to an AN. As such, the communication can be conducted between a first user on one wireless or wired AT and a second user on a wireless or a wired AN.

As mentioned above, the multiple access communication system can communicate voice and/or data. With the wide popularity of data-based service (e.g., world wide web), interest in data-based communication is increasing. An example of a data only communication system is a high data rate (HDR) communication system (e.g., a CDMA system). The HDR communication system is a system dedicated to transmission of packet data. For efficient packet transmission on a FL and a RL in this system, scheduling has to be appropriately made. Scheduling is a procedure of the AN for determining and controlling data rates of the ATs. The AN conducts scheduling based on feedback information transmitted from the ATs on the basis of information related to power of the ATs and quantity of data to be transmitted from the ATs. That is, the AN controls data rates of various ATs.

In operation, on the FL, an AN transmits data to a particular AT having the best channel status so that the data transmission throughput of the AT can be maximized. On the RL, a plurality of ATs access the AN simultaneously. Therefore, the AN controls the data flow from the ATs in order to prevent traffic congestion and controls overhead within its capacity.

Data transmission on the RL is controlled by the use of a Reverse Activity Bit (RAB) and a Reverse Rate Limit (RRL) message transmitted from an AN in the existing HDR system. A forward Medium Access control (MAC) channel is transmitted to an AT in time division multiplexing (TDM) along with a pilot channel, a Forward Activity Bit (FAB), and an RAB. The RAB represents the congestion of the RL, and a data rate available to the AT varies with the RAB. That is, the AN increases or decreases the data rate of the AT by means of the RAB when controlling overhead and capacity on the RL.

Information related to data rate is usually communicated between the AT and the AN, and in so doing, overheads in form of signaling are increased. By reducing or simplifying overhead with respect to signaling, the system can operate more efficiently.

SUMMARY OF THE INVENTION

Accordingly, the present invention is directed to a method of enabling a combined data rate control lock channel in a wireless communication system that substantially obviates one or more problems due to limitations and disadvantages of the related art.

An object of the present invention is to provide a method of assigning feedback information in a portion of a Medium Access Control (MAC) channel in a wireless communication system.

Another object of the present invention is to provide a method of assigning feedback information in a control channel in a communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of assigning feedback information in a portion of a Medium Access Control (MAC) channel in a wireless communication system includes receiving at least two pilot signal from an access network (AN) on at least two forward traffic channel, transmitting at least two channel quality information on a single reverse carrier to the AN reporting at least one of strength and quality of each corresponding forward pilot channel, wherein the channel quality information indicates a desired data rate for receiving data on the corresponding forward traffic channel, and receiving feedback information through a forward control channel of the AN, wherein the feedback information includes combined channel quality information which indicates whether or not the AN is able to receive multiple channel quality information sent by an access terminal (AT) on the single reverse carrier.

In another aspect of the present invention, a method of assigning feedback information in a portion of a Medium Access Control (MAC) channel in a wireless communication system includes receiving at least two pilot signals from an access network (AN) on at least two forward channels, transmitting through a single reverse channel at least two channel quality information to the AN reporting at least one of strength and quality of each corresponding forward pilot channel, wherein the channel quality information indicates a desired data rate for receiving data on the corresponding forward traffic channel, and receiving at least two feedback information through at least two forward channels of the AN, wherein the feedback information includes combined channel quality information which indicates whether or not the AN is able to receive multiple quality information sent by an access terminal (AT) on the single reverse channel, and wherein the at least two feedback information contain same information and is transmitted through the at least two forward channels.

In a further aspect of the present invention, a method of assigning feedback information in a control channel in a communication system includes receiving at least two pilot signals from a base station (BS) on at least one forward control channel, transmitting at least two channel quality information to the BS reporting at least one of strength and quality of each corresponding forward control channel, wherein the channel quality information indicates a desired data rate for receiving data on the corresponding forward control channel, and receiving feedback information through a reverse control channel of the BS, wherein the feedback information includes combined channel quality information which indicates whether or not the BS is able to receive the channel quality information sent by a mobile station (MS).

In another aspect of the present invention, a method of assigning feedback information in a portion of a Medium Access Control (MAC) channel in a wireless communication system includes transmitting at least two pilot signals to an access terminal (AT) on at least two forward channels, receiving through a single reverse channel at least two channel quality information from the AT reporting at least one of strength and quality of each corresponding forward pilot channel, wherein the channel quality information indicates a desired data rate for receiving data on the corresponding forward traffic channel, and transmitting at least two feedback information through at least two forward control channels of an access network (AN), wherein the feedback information includes combined channel quality information which indicates whether or not the AN is able to receive multiple channel quality information sent by the AT, and wherein the at least one feedback information contain same information and is transmitted through the at least two forward channels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
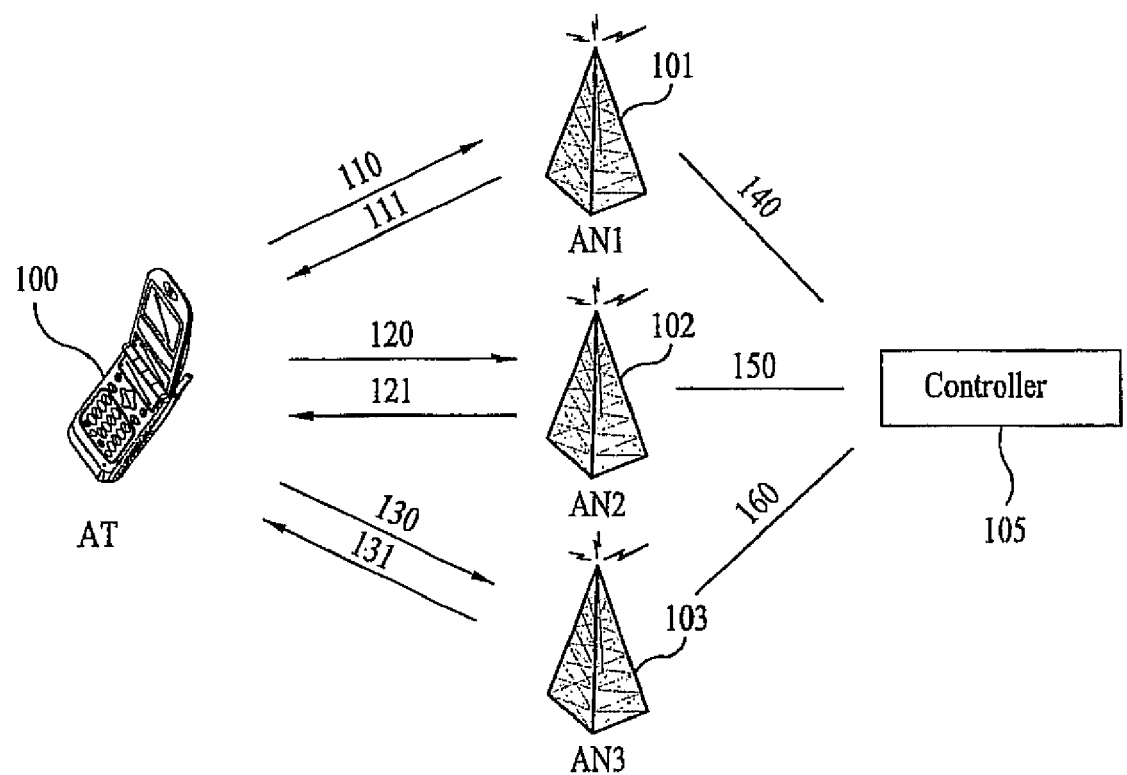
FIG. 1 illustrates a conceptual diagram of a wireless communication system.

FIG. 1 illustrates a conceptual diagram of a wireless communication system. An AN 101 transmits data to an AT 100 over a Forward Link (FL) 110, and the AN1 101 receives data from the AT 100 over a Reverse Link (RL). Similarly, AN2 102 and AN3 103 transmit data to the AT 100 over a FL 120 and a FL 130, respectively, and receive data from the AT 100 over a RL 121 and a RL 131, respectively.

Data transmission on the FL can occur from one AN to one AT at or near the maximum data rate that can be supported by the FL and the communication system. Other channels of the FL (e.g., control channel) can be transmitted from multiple ANs to one AT. Data transmission on the RL can take place from one AT to one or more ANs. The AN1 101, AN2 102, and AN3 103 are connected to a controller 105 over backhauls 140, 150, and 160, respectively. The term backhaul is used to mean a communication link between a controller and an AN. Although only one AT and three ANs are shown in FIG. 1, one of ordinary skill in the art recognizes that this is merely an example, and the communication system can comprise a plurality of ATs and ANs.

Initially, the AT 100 and one of the ANs (e.g., AN1) can establish a communication link using a predetermined access procedure. In this connected state, the AT 100 is able to receive data and control messages from the AN1 101. In the meantime, the AT 100 continually searches for other ANs that could be added to the AT 100 active set, Here, the active set comprises a list of the ANs capable of communicating with the AT 100. When such an AN is found, the AT 100 calculates the quality of the AN's FL. For example, the quality of the FL of the AN can be determined by a Signal-to-Noise Ratio (SINR) of a pilot signal of the corresponding AN. At the same time, the AT 100 can calculate the FL quality for each AN in the AT active set. Based on the calculated values, the AN can be added or removed from the AT 100 active set.

Thereafter, if an AN is selected from the active set based on a set a parameters, this AN is referred to as a serving AN. Here, the serving AN can also refer to the AN that is communicating with the AT. The set of parameters can include present and previous SINR measurements, a bit-error-rate, and other parameters known to one skilled in the art. For example, an AN is selected in accordance with the largest SINR measurement.

The AT 100 can then transmit to the selected AN a data rate control (DRC) message on a DRC channel. Transmission of the DRC message can also be referred to as DRC reporting. Here, the AT can transmit DRC message or report DRC as often as once every 1.67 ms.

In 1xEV-DO, all of the parameters associated with the DRC are fixed if the AT selects a DRC. In other words, selecting a DRC fixes a data rate, packet length, number of slots, coding rate, modulation type, preamble length, and repetition. In Nx EV-DO, however, the AT's DRC selection provides the AN with a set of compatible transmission formats. That is, the AN can decide which transmission format to use considering the size of the packet, packet type (for single or multiple ATs), quality of service (QoS), and requirements of other users active on the sector.

The DRC message includes radio conditions measured by each AT and can contain the requested data rate or, alternatively, an indication of the quality of the forward link (e.g., the measured SINR or the bit-error-rate). For example, the AT 100 can direct the transmission of the DRC message to a specific AN by the use of a Walsh code, which uniquely identifies the specific AN. The DRC message symbols are exclusively OR'ed (XOR) with the unique Walsh code. The XOR operation is referred to as Walsh-covering of a signal. Since each AN in the active set of the AT 100 is identified by a unique Walsh code, only the selected AN which performs the identical XOR operation as that performed by the AT 100 with the correct Walsh code can correctly decode the DRC message.

The data to be transmitted to the AT 100 is received at a controller 105. For example, the controller 105 sends the data to all ANs in AT 100 active set over the backhaul 140, 150, and 160. Thereafter, the controller 105 can first determine which AN was selected by the AT 100 as the serving AN, and then can send the data to the serving AN. The data are stored in a queue at the AN(s). A paging message can then be sent by one or more ANs to the AT 100 on respective control channels. The AT 100 can then demodulate and decode the signals on one or more control channels to obtain the paging messages.

At each time time-slot, the AN can schedule data transmission to any of the ATs that received the paging message. The AN uses the rate control information received from each AT in the DRC message to efficiently transmit FL data at the highest possible rate. For example, the AN determines the data rate at which to transmit the data to the AT 100 based on the most recent value of the DRC message received from the AT 100. Additionally, the AN can uniquely identify a transmission to the AT 100 by using a spreading code (e.g., long pseudo noise (PN) code) which is unique to that mobile station.

The AT 100 for which the data packet is intended, receives the data transmission and decodes the data packet. For example, each data packet is associated with an identifier (e.g., a sequence number) which is used by the AT 100 to detect either missed or duplicate transmissions. In such an event, the AT 100 communicates via the RL data channel the sequence numbers of the missing data units. The controller 105, which receives the data messages from the AT 100 via the AN communicating with the AT 100, then indicates to the AN what data units were not received by the AT 100. The AN then schedules a retransmission of such data units.

When the communication link between the AT 100 and the AN1 101, operating in the variable rate mode, deteriorates below required reliability level, the AT 100 first attempts to determine whether communication with another AN in the variable rate mode supporting an acceptable rate data is possible. If the AT 100 ascertains such an AN (e.g., AN2 102 or AN3 103), a re-directing to the AN 102 to a different communication link can occur, and the data transmissions continue from the AN 102 in the variable rate mode. The above-mentioned deterioration of the communication link can be caused by (e.g., the AT 100 moving from a coverage area of the AN 100 to the coverage area of the AN2 102) shadowing, fading, and other reasons known to one skilled in the art. Alternatively, when a communication link between the AT 100 and another AN (e.g., AN2 102 or AN3 103) that can achieve higher throughput rate that the currently used communication link becomes available, a re-directing to the AN 102 to a different communication link can occur, and the data transmissions continue from the AN 102 in the variable rate mode. If the AT 100 fails to detect an AN that can operate in the variable rate mode and support an acceptable data rate, the AT 100 transitions into a fixed rate mode.

As an implementation example, the AT 100 can evaluate the communications links with all candidate ANs for both variable rate data and fixed rate data modes and selects the AN, which yields the highest throughput.

The AT 100 can switch from the fixed rate mode back to the variable rate mode if the sector is no longer a member of the AT 100 active set.

One skilled in the art recognizes that an AN can comprise one or more sectors. In the description above, the term AN was used generically to allow clear explanation of basic concepts of the HDR communication system. However, one skilled in the art can extend the explained concepts to AN comprising any number of sectors.

As discussed, the HDR communication system can be used to transmit voice and/or data. Staying in line with the advancements in technology, wireless telecommunications have advanced from a network of analog carriers to large digital networks using many different standards. Some standards are designed as both data and voice carriers, while others are primarily designed as data-only carriers, such as the Evolution Data-Only (EV-DO) standard. Data-Only is also referred to as Data Optimized.

FL characteristics of EV-DO include absence of power control as well as absence of soft handoff. More specifically, the AN transmits at a constant power while the AT requests for variable rates on the FL. More detailed explanation of the FL will be provided.

With respect to the EV-DO standard, for transmitting on the forward traffic channel, the AN takes a Physical Layer packet of one of several standard sizes in bits, modulates it into a symbol sequence, and then applies repetition and puncturing, as appropriate, to generate a modulated packet.

The AN then transmits a portion, or subpacket, of the modulated packet. If the AT receives the subpacket with few enough symbol errors, it can demodulate and reconstruct the original Physical Layer packet without bit errors. The AT then tries to reconstruct the original packet without bit errors using both of the subpackets it has received.

Figure 2:
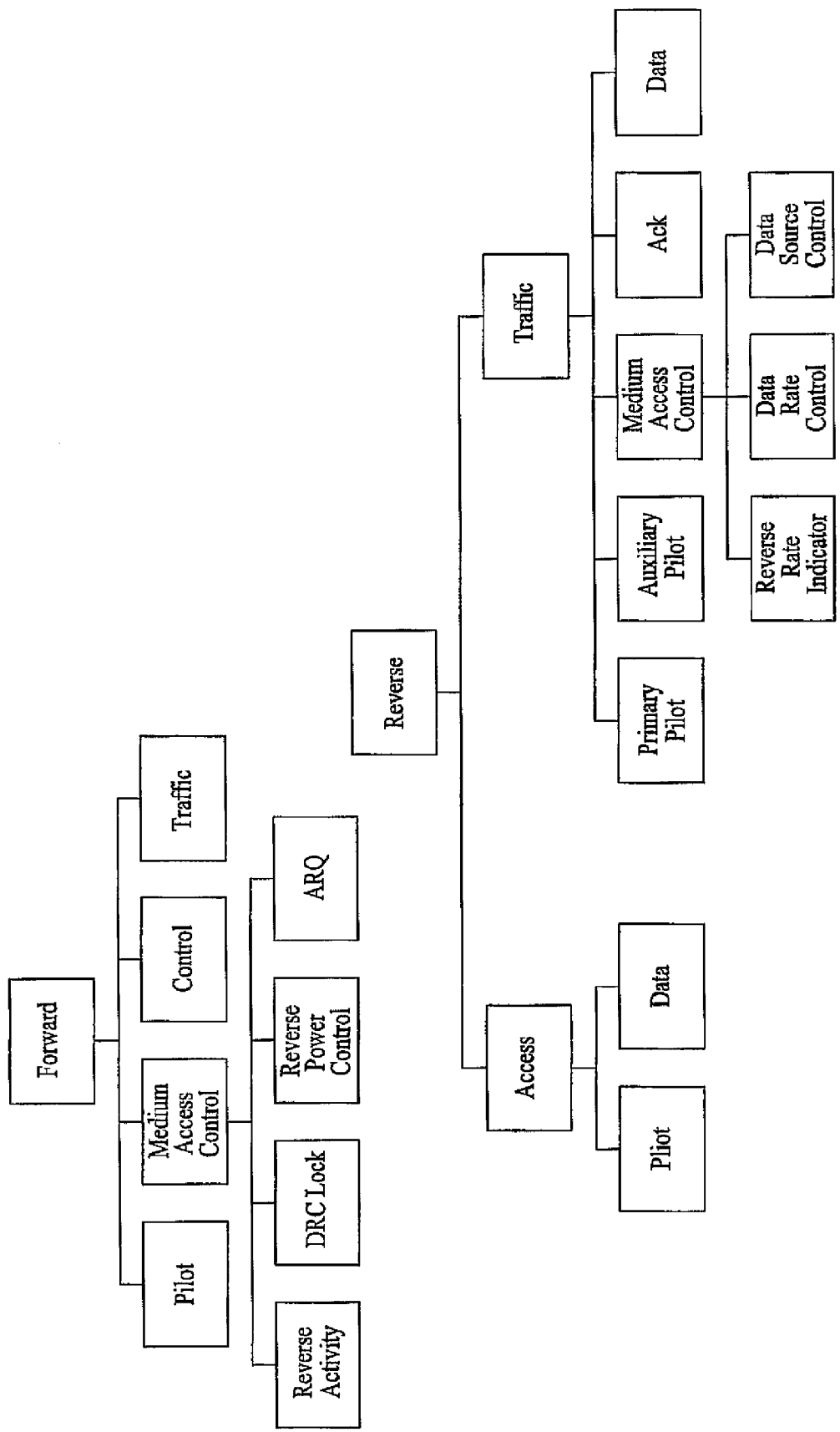
FIG. 2 is a block diagram of forward and reverse physical layer channels.

FIG. 2 is a block diagram of forward and reverse physical layer channels. As depicted in FIG. 2, the forward physical layer channels can be defined by a pilot channel, a Medium Access Control (MAC) channel, a control channel, and a traffic channel. Here, the MAC channel can be further defined by a reverse activity (RA) channel, a DRC Lock channel, a RPC channel, and a ARQ channel. Here, the forward physical channels are transmitted to the AT in a TDM scheme. A control message and an encapsulated user data packet are transmitted through the forward control channel (i.e., DRC channel) corresponding to a common channel. The forward MAC channel is used to transmit various information such as reverse rate control (i.e., DRC) information and power control information.

Further, the reverse physical layer channel can be defined by an access channel and a traffic channel. The access channel is used by the AT to establish connection with the AN, and this channel can be further defined by a pilot channel and a data channel. The traffic channel can comprise a primary and auxiliary pilot channels, a MAC channel, an acknowledgement (ACK) channel, and a data channel. Here, the MAC channel can be further defined by a reverse rate indicator (RRI) channel, a DRC channel, and a data source control channel.

The reverse physical channels are different from the forward physical channels in that the reverse physical channels have different identification codes on an AT-by-AT basis. The AT-by-AT reverse channels are a pilot channel, reverse traffic channel, DRC channel, reverse rate indicator (RRI) channel, access channel, and so on. A user data packet is transmitted through the reverse traffic channel. The access channel is used when the AT transmits a message or traffic to the AN before a traffic channel is connected. The DRC channel is used to notify the AN of the highest transmission rate at which the AT can receive data as well as the channel quality of the channel for AN-to-AT transmission. The RRI channel is used to give notification of a transmission rate at which data is transmitted through the reverse traffic channel.

Figure 3:
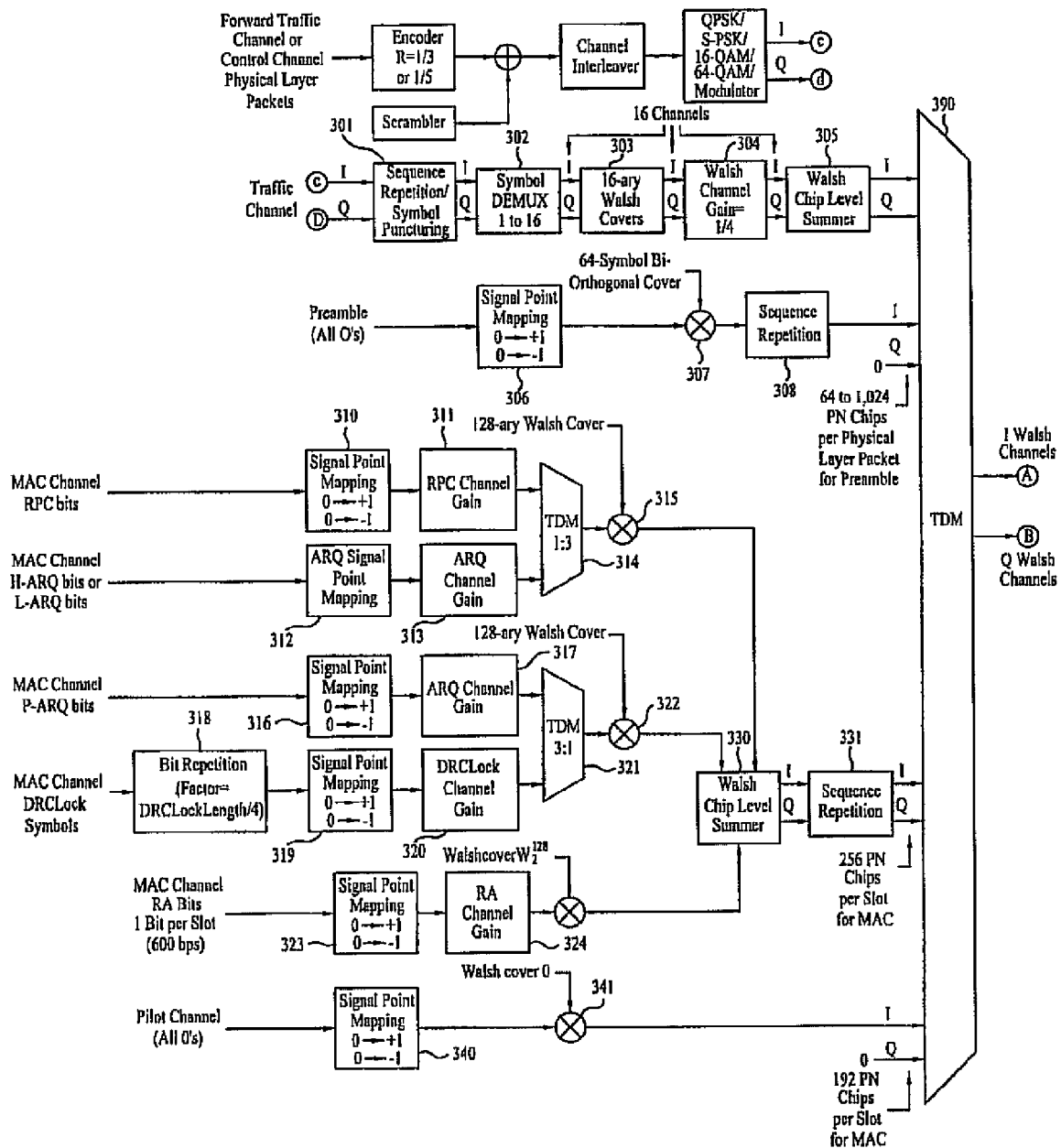
FIG. 3 is a block diagram of a forward channel structure of an HDR communication system.

FIG. 3 is a block diagram of a forward channel structure of an HDR communication system. Referring to FIG. 3, the forward channel can transmit traffic channel, a preamble, a Medium Access Control (MAC) channel, and a pilot channel to an AT. After the traffic channel signal is encoded in an encoder (not shown), modulated in a modulator (not shown), and interleaved in an interleaver (not shown), the traffic channel signal is punctured and repeated according to a data rate in a sequence repetition/symbol puncturing unit 301. A symbol demultiplexer (DEMUX) 302 demultiplexes the output of the sequence repetition/symbol puncturing unit 301. For example, the DEMUX 302 converts 16 successive bits as 16 parallel channel signals. A Walsh spreader 303 spreads each of the 16 channel signals by 16 Walsh codes. Thereafter, a Walsh channel gain unit 304 controls the gains of the spread signals. A Walsh chip level summer 305 sums the outputs of Walsh channel gain unit 304 at a chip level.

The preamble is mapped by a signal point mapping unit 306. More specifically, the signal point mapping unit 306 maps 0s and 1s to +1s and −1s, respectively. A Walsh spreader 307 spreads the output of the signal point mapping unit 306 with a predetermined Walsh code (e.g., 64-symbol bi-orthogonal cover). Then the output of the Walsh spread 307 is repeated by a sequence repetition unit 308, A first time division multiplexer (TDM) 390 multiplexes using time division feature the traffic channel signal received from the Walsh chip level summer unit 305 and the preamble signal received from the sequence repetition unit 308 according to a TDM control signal.

The forward MAC channel transmits, for example, a reverse power control (RPC) bits, hybrid automatic request (H-ARQ) bits, a last ARQ (L-ARQ), a packet ARQ (P-ARQ), and/or DRCLock symbols. In addition, the forward MAC channel can transmit a forward activity bit (FAB) and a reverse activity bit (RAB). The H-ARQ indicates whether the packet transmitted in specific slots (e.g., m-8, m-7, m-6, or m-5) was successfully received or not by the AN. The L-ARQ indicates of the reception of the fourth sub-packet using negative acknowledgement-oriented ON-OFF keying. The P-ARQ indicates whether the packet transmitted starting in a specific slot (e.g., m-48) was specifically received by the AN.

Accordingly, the MAC channel can be further defined by the RA channel which carries the RAB, the RPC channel which transmits the RPC bits, the ARQ channel for carrying the H-ARQ bits, L-ARQ bits, and P-ARQ bits, and the DRCLock channel for carrying the DRCLock symbols.

With respect to the RA channel, the AN uses the RA channel to inform all ATs within its coverage area of the current activity on the reverse link (RL) The RA channel carries the RAB which can be transmitted over RABLength successive slots at a data rate of 600 bps.

With respect to the RPC channel, the AN uses the RPC channel to power control the AT's RL transmission. The RPC bit is transmitted through the RPC channel having a data rate of 150 bps, for example. With respect to the DRCLock channel, the AT uses this channel to provide DRC quality to the AN. To put simply, the AN reports to the AT whether the quality of the DRC is good or bad. For example, the DRCLock can be represented in one (1) bit (e.g., '0' for bad and '1' for good).

Further to the DRCLock channel, if a sector or an AN cannot hear the DRC from a particular AT, the AN (sector) does not schedule this particular AT for FL transmission, and consequently, the AT continues to request for service through the DRC. For example, if the DRCLock bit for the AT is set to '0', the AT stops sending the DRC to that sector.

No power control is performed on the forward link of a mobile communication system (e g., HDR system) because it transmits signals with its maximum transmission power. However, a soft handover and a power control are required on the reverse link. Therefore, the AN transmits the RPC bit as reverse power control information. When the RPC bit is generated in every frame (e.g., 26.67 ms), a signal point mapping unit 310 generates a signal of +1 or −1 in a real transmission form. A RPC channel gain unit 311 controls the gains and then whose output is multiplied by a TDM multiplier 314. Thereafter, the output of the TDM multiplier 314 is spread by a Walsh code (e.g., 128-ary Walsh code).

Similarly, the DRCLock symbol can be transmitted by the forward MAC channel. In the process, the DRCLock symbol is passed through a bit repetition unit 318. The output of the repetition unit 318 is then processed through a signal point mapping unit 319. A DRCLock channel gain unit 320 controls the gains and then whose output is multiplied by a TDM multiplier 321. Thereafter, the output of the TDM multiplier 321 is spread by a Walsh code (e.g., 128-ary Walsh code).

Referring to the RAB, it is also processed through a signal point mapping unit 323 and converted to a signal of +1 or −1 in a real transmission form and a reverse activity (RA) channel gain unit 324 controls the gains. Thereafter, the output of the RA channel gain unit 324 is multiplied by Walsh code 325.

Referring to pilot channel, 0s and 1s of the pilot channel signal are mapped to +1s and −1s, respectively, in a signal point mapping unit 340. Thereafter, a multiplier 341 multiplies the out of the signal point mapping unit 340 by a predetermined Walsh code and outputs a spread pilot channel signal.

A Walsh chip level summer 330 sums the RPC, RAB, DRCLock symbols, and a like. A sequence repletion unit 331 repeats the sum a specified number of time (e.g., three times) and multiplexes the repeated sum in the second half of a forward transmission slot prior to transmission to the AT. A TDM multiplier 390 multiplexes the outputs received from the Walsh chip level summer unit 305, the sequence repetition units 305 and 331, and from the multiplier 341.

Table 1 shows modulation parameters of the RA channel, RPC channel, and DRCLock channel.

TABLE 1

| Parameter | RA Channel | RPC Channel | DRCLock Channel |
|---|---|---|---|
| Rate (bps) | 600 | 150 | 150/(DRCLockLength) |
| Bit Repetition Factor | 1 | 1 | DRCLockLength |
| Modulation (Channel) | BPSK(I) | BPSK(I or Q) | BPSK(I or Q) |
| Modulation Symbol Rate (sps) | 1,200 | 300 | 300 |
| Walsh Cover Length | 128 | 128 | 128 |
| Walsh Sequence Repetition Factor | 2 | 2 | 2 |
| PN Chips/Slot | 256 | 256 | 256 |
| PN Chips/Bit | 256 | 256 | 256 × DRCLockLength |

Contrary to the FL characteristics, RL characteristics of EV-DO include power control, soft handoff, and absence of time-division multiplexing (TDM). More specifically, the AN can power control the RL by using the RPC. Moreover, more than one AN can receive AT's transmission. In addition, there are two protocols used to process two types of messages, namely, a reverse traffic channel MAC protocol associated with a user data message, and an access channel MAC protocol associated with signaling message.

In the 1xEV-DO system, there is usually one FL carrier to one RL carrier. In other words, one-to-one relationship exists between the FL carrier and the RL carrier. However, in a Nx EV-DO system, there is usually more than one FL carrier and at least one RL carrier. In the Nx EV-DO system, as in the 1xEV-DO system, the channel quality of the FL carriers is provided by the DRC, and the channel quality of the RL carrier is provided by the DRCLock.

In detail, when the AN has data to send to the AT, the AN first determines the FL channel status or condition in order to ensure rapid and reliable transmission of the data. As mentioned, in the Nx EV-DO, the AT is usually associated with multiple FL carriers. As such, the AN sends a signal (e.g., pilot signal) to the AT on each of the forward traffic channel, for example. Upon receiving the signal, the AT determines the quality of the forward traffic channel on which the signal was received and transmits channel quality information (hereinafter, referred to as DRC) of the corresponding channel to the AN on a single channel. That is, even if there is a plurality of DRCs corresponding to the forward traffic channels, only one reverse traffic channel is used to send the plurality of these DRCs to the AN. Here, the AT can include in the DRC a data rate which it believes would be best for receiving the data based on the channel condition of each forward channel. In addition, the DRC can include information on its location. The location information is important since AT may be in transit.

The AN then receives and decodes the DRC received from the AT, In response, the AN sends feedback information (also referred to as DRCLock) to the AT when there is more than one DRC reported from the AT, as is the case above. The feedback information or the DRCLock includes combined channel quality information (or combined DRCLock) which indicates whether or not the AN is able to receive the DRCs transmitted by the AT. That is, the AN notifies the AT the status of the RL channels as a whole.

For example, if the DRC associated with three (3) FL carriers are transmitted to the AN on the reverse traffic channel, the AN determines whether it can correctly receive the DRCs of three (3) FL channels sent by the AT on a single reverse channel. The AN then sends the result of the determination on one of the three (3) FL channels.

Figure 4:
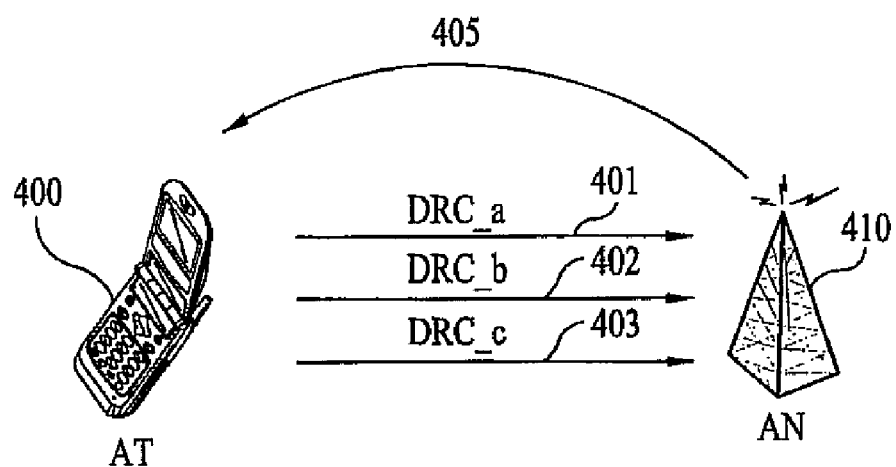
FIG. 4 illustrates an exemplary communication system having more than one FL carrier and one RL carrier.

FIG. 4 illustrates an exemplary communication system having more than one FL carrier and one RL carrier. The FL carriers are used to carry data from an AN 410 to an AT 400. As discussed, the DRCs related to the FL carriers are provided to the AN 410 by the AT 400, and the DRCs represent channel quality of the FL channel. Here, this information is transmitted by the RL carrier. Since there is a single RL carrier, the DRCs (e.g., DRC_a, DRC_b, and DRC_c) can be multiplexed.

Referring to FIG. 4, three (3) DRCs for each FL channel are provided, namely, DRC_a 401, DRC_b 402, and DRC_c 403, on a single RL channel. Prior to receiving the DRCs for each FL channel, the AN 410 sends three signals (e.g., pilot signals) to the AT 400 on the three FL channels so as to aid channel condition determination of the FL channel. Using the pilot signal, for example, the AT 400 determines the channel quality of the forward traffic channel and sends the DRC information for each FL channel received to the AN 410. As discussed, the RL carrier is used to provide channel quality of control signal from AT 400 to AN 410.

Since only one RL carrier is available for the AT-to-AN transmission, a single RL carrier is used. Here, on the RL, the DRCs (e.g., DRC_a, DRC_b, and DRC_c) can be multiplexed. Furthermore, in the RL transmission, the AT 400 includes a desired data rate at which the AT 400 desires to receive the data on each FL traffic channel. The AT 400 also includes serving sector information which indicates the serving section of the AT. The AT location information is useful especially during handover (also referred to as handoff) situations.

After the AN 410 receives the DRCs from the AT 400, the AN 410 can use a DRCLock channel to provide the quality of the RL channel on which the DRC information was provided. More specifically, a combined DRCLock channel 405, which represents a portion of a forward MAC channel, can be used when there is more than one multiplexed DRC being reported on the RL carrier.

In practice, the combined DRCLock can be used to indicate to the AT 400 whether the AN 410 is able or unable to receive the information on the DRCs sent by the AT 400. For example, a single bit can be used to represent the combined DRCLock. That is, if the combined DRCLock is represented by '0,' then it indicates that the AN 410 cannot receive the DRC information, whereas if the combined DRCLock is represented by '1,' then it indicates that the AN 410 is able to receive the DRC information. Here, the combined DRCLock information is generated based on quality of the RL channel.

Figure 5:
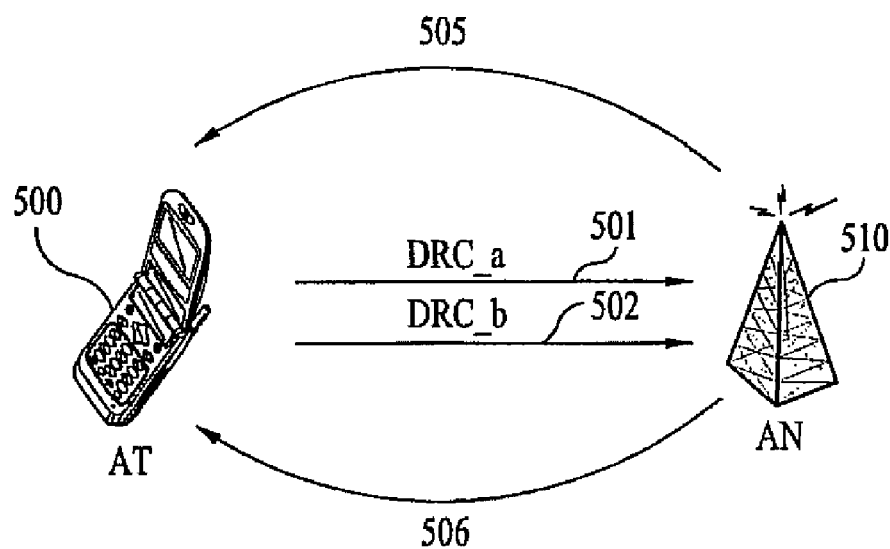
FIG. 5 illustrates a communication system having at least two FL carriers and at least two RL carriers according to another embodiment of present invention.

FIG. 5 illustrates a communication system having at least two FL carriers and at least two RL carriers according to another embodiment of present invention. In FIG. 5, there are two (2) FL carriers and two RL carriers. The FL carriers are used to carry data from the AN 510 to the AT 500. Here, two (2) DRCs for each FL channel are provided, namely, DRC_a 501 and DRC_b 502, on a single RL traffic channel. Any one of the at least two RL carrier can be used to transmit the DRCs. As discussed, the DRCs can be multiplexed on a single RL carrier. Moreover, the transmission from the AT 500 to the AN 510 can further include desired data rate for FL transmission and the sector information.

In response to the DRCs reported on one of the RL carriers, the AN 510 can assign any one of the FL carriers (e.g., 505) to send a combined DRCLock to indicate to the AT 500 whether the AN 510 can or cannot receive the information on the DRC channel (501 or 502). Further, the unused DRC Lock channel on 506 can be used as a RL feedback channel for the same or another AT. Alternatively, the DRCLock channel that does not carry the DRC information can send the same values as those sent on the combined DRCLock channel (also can be referred to as a redundant DRCLock). To put differently, if the AT does not transmit the DRC information on the reverse link carrier, the AN may use the DRCLock channel of the corresponding forward link to send redundant information. Here, the value of the DRCLock channel is same as the DRCLock channel value on another forward link whose corresponding reverse link carries DRC information. In addition, if the AT does not transmit the DRC information on the reverse link carrier, the AN may use the resource of the DRCLock channel on the forward link as a reverse feedback channel for the same or different AT.

For example, assume that the AT 500 is assigned two (2) FL carriers (i.e., carriers 'a' and 'b') and two (2) RL carriers (i.e., carries 'x' and 'y'). If the DRCs for 'a' and 'b' are reported only on carrier 'y', the other carrier (i.e., carrier 'x') is not used. Here, the DRCs for 'a' and 'b' are multiplexed. Upon receiving the DRC information, the AN 510 sends a combined DRCLock channel on carrier 'b' with the value indicating the quality of both DRCLock_a and DRCLock_b. Alternatively, the AN 510 also can send a redundant DRCLock values to the AT 500 on FL carrier 'a'.

As discussed above, the combined DRCLock channel can be expressed using a single bit. That is, if the combined DRCLock is represented by '0,' then it indicates that the AN 510 cannot receive the DRC information, whereas if the combined DRCLock is represented by '1,' then it indicates that the AN 510 is able to receive the DRC information. Further, the unused FL channel can be used to send the redundant DRCLock value.

In the discussion of above, the AT can also be referred to as a mobile station, a mobile subscriber station, a terminal, a mobile terminal, and a like. Further, the AN can also be referred to as a node, a base station, a base subscriber station, a base terminal, a base terminal station, and a like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of data communications between an access terminal (AT) and an access network (AN) for assigning feedback information in a portion of a Medium Access Control (MAC) channel in a wireless communication system, the method comprising:

receiving, at the AT, at least two pilot signals from the AN on at least two forward traffic channels;

transmitting, from the AT, channel quality information to the AN for each of the at least two forward traffic channels on a single reverse traffic channel, wherein the channel quality information includes a desired data rate at which the AT desires to receive data on each of the at least two forward traffic channels, location information indicating a location of the AT and at least a strength of each of the at least two forward traffic channels or a quality of each of the at least two forward traffic channels;

receiving, at the AT, first feedback information from the AN through a first forward traffic channel of the at least two forward traffic channels, wherein the first feedback information includes combined channel quality information indicating whether the single reverse traffic channel comprises an adequate quality for allowing the AN to receive the channel quality information for the at least two forward traffic channels sent by the AT on the single reverse traffic channel; and receiving, at the AT, second feedback information from the AN through a second forward traffic channel of the at least two forward traffic channels, the second feedback information including the combined channel quality information.

2. The method of claim 1, wherein the channel quality information is a data rate control (DRC) information.

3. The method of claim 1, wherein the combined channel quality information is represented by one bit.

4. The method of claim 3, wherein the combined channel quality information of '0' indicates to the AT that the AN is unable to receive the channel quality information sent by the AT, and the combined channel quality information of '1' indicates to the AT that the AN is able to receive the channel quality information sent by the AT.

5. The method of claim 1, wherein the combined channel quality information is generated based on quality of multiple reverse Data Rate Control channels.

6. The method of claim 1, wherein the first and second forward traffic channels each comprise a Data Rate Control Lock (DRCLock) channel included in the portion of the MAC channel.

7. The method of claim 1, wherein the single reverse traffic channel is a Data Rate Control (DRC) channel.

8. A method of data communications between an access network (AN) and an access terminal (AT) for assigning feedback information in a portion of a Medium Access Control (MAC) channel in a wireless communication system, the method comprising:

transmitting, from the AN, at least two pilot signals to the AT on at least two forward traffic channels;

receiving, at the AN, channel quality information from the AT for each of the at least two forward traffic channels on a single reverse traffic channel, wherein the channel quality information includes a desired data rate at which the AT desires to receive data on each of the at least two forward traffic channels, location information indicating a location of the AT and at least a strength of each of the at least two forward traffic channels or a quality of each of the at least two forward traffic channels;

transmitting, from the AN, first feedback information to the AT on a first forward traffic channel of the at least two forward traffic channels, wherein the first feedback information includes combined channel quality information which indicates whether the single reverse traffic channel comprises an adequate quality for allowing the AN to receive the channel quality information for the at least two forward traffic channels sent by the AT on the single reverse traffic channel; and transmitting, from the AN, second feedback information to the AT through a second forward traffic channel of the at least two forward traffic channels, the second feedback information including the combined channel quality information.

* * * * *